(12) United States Patent
Leys et al.

(10) Patent No.: US 9,481,389 B2
(45) Date of Patent: Nov. 1, 2016

(54) CONVERTIBLE JOGGING AND ALL-TERRAIN STROLLERS

(71) Applicant: Orbit Baby, Inc., Newark, CA (US)

(72) Inventors: Colter P. Leys, Salt Lake City, UT (US); Alfredo Santos, San Francisco, CA (US); Joseph Hei, Palo Alto, CA (US); Cynthia E. Bartz, Newark, CA (US); Lance Dudkowski, Newark, CA (US); Sarah Marie Maddox, Newark, CA (US); Marcus C. Wang, Oakland, CA (US)

(73) Assignee: Orbit Baby, Inc., Newark, CA (US)

( * ) Notice: Subject to any disclaimer, the term of this patent is extended or adjusted under 35 U.S.C. 154(b) by 0 days.

(21) Appl. No.: 14/734,830

(22) Filed: Jun. 9, 2015

(65) Prior Publication Data

US 2015/0353116 A1     Dec. 10, 2015

Related U.S. Application Data

(60) Provisional application No. 62/009,770, filed on Jun. 9, 2014.

(51) Int. Cl.
*B62B 7/00* (2006.01)
*B62B 7/12* (2006.01)
*B62B 7/04* (2006.01)
*B62B 9/12* (2006.01)

(52) U.S. Cl.
CPC ............... *B62B 7/12* (2013.01); *B62B 7/044* (2013.01); *B62B 9/12* (2013.01)

(58) Field of Classification Search
CPC ........... B62B 7/00; B62B 7/08; B62B 7/044; B62B 7/062; B62B 7/064; B62B 5/064; B62B 2206/02; B62B 2205/20; B62B 7/06; B62B 7/068
See application file for complete search history.

(56) References Cited

U.S. PATENT DOCUMENTS

| | | | |
|---|---|---|---|
| 7,083,175 B1 * | 8/2006 | Liu | B60B 1/006 16/35 R |
| 2002/0041083 A1 * | 4/2002 | Britton | B62B 7/044 280/650 |

\* cited by examiner

*Primary Examiner* — Bryan Evans
(74) *Attorney, Agent, or Firm* — Morrison & Foerster LLP

(57) ABSTRACT

A convertible stroller for selectively converting between two different active use modes is provided. The convertible stroller may include a frame supporting at least one front wheel, rear wheels, and a seat base for supporting (or including) a seating surface. The seat base is operable to be selectively positioned in at least two different use modes, a first use mode and a second use mode, wherein the first use mode positions the seat base at a relatively higher position than in the second use mode. In some examples, the frame and/or wheels are also operable to transition to a longer wheel base in the second use mode.

20 Claims, 22 Drawing Sheets

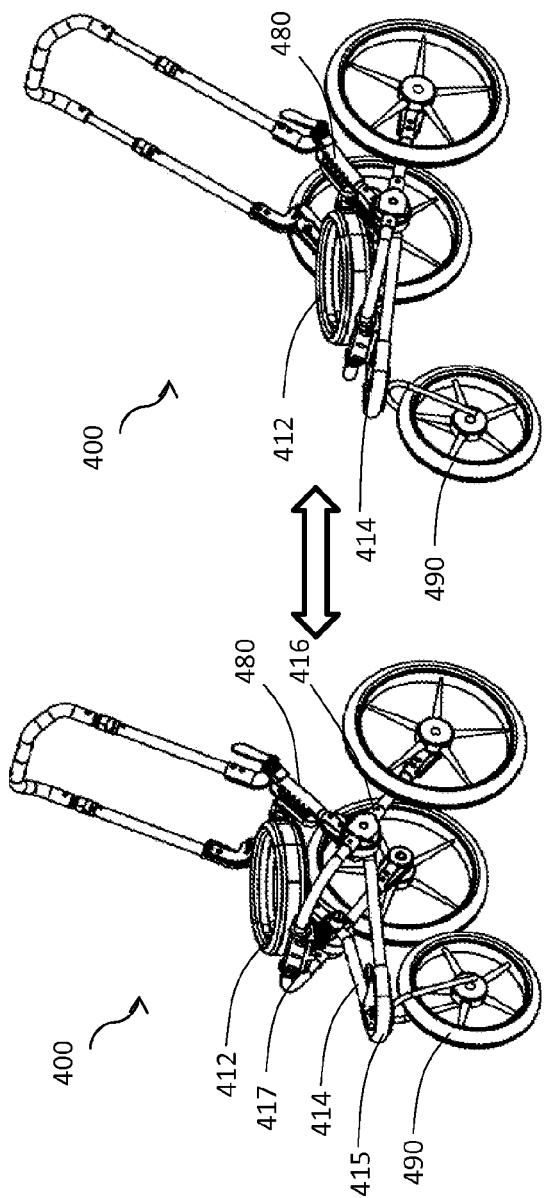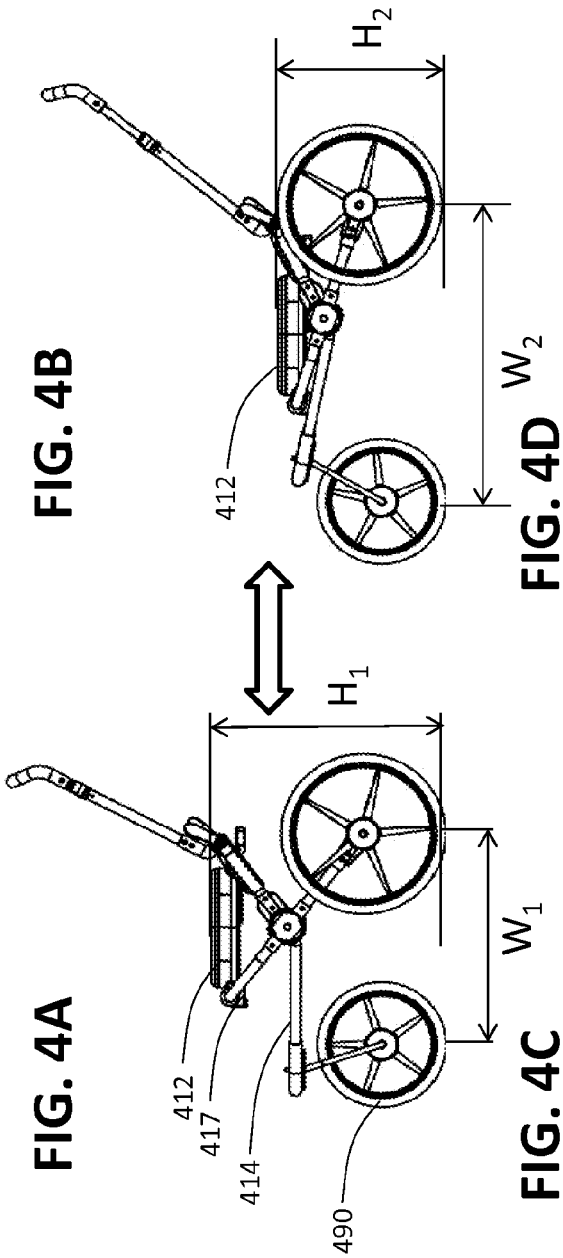

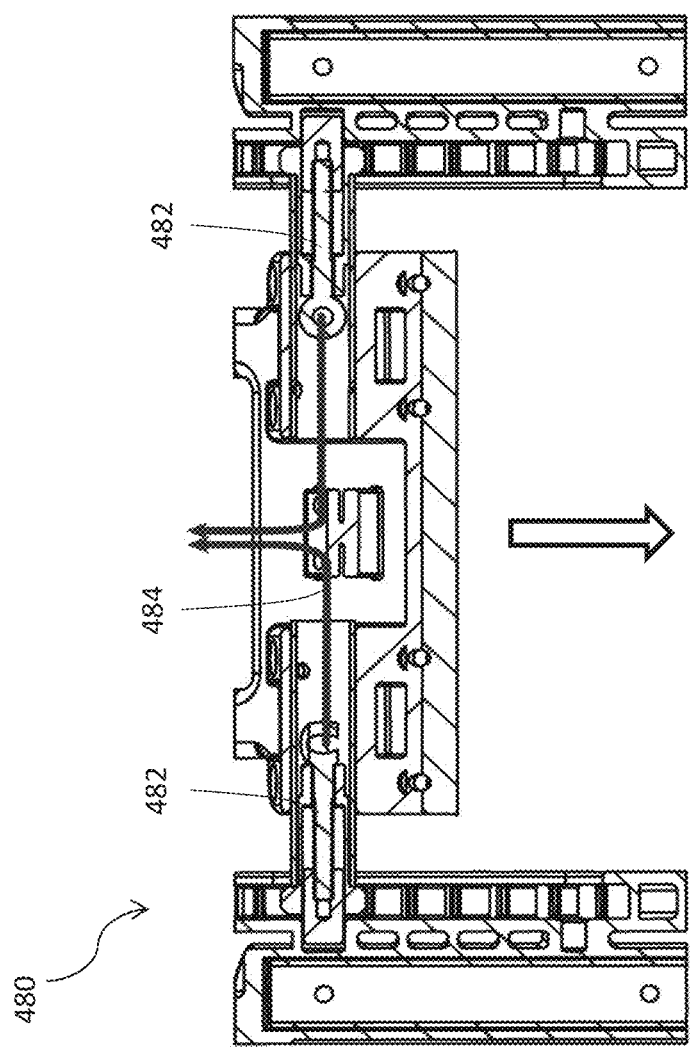
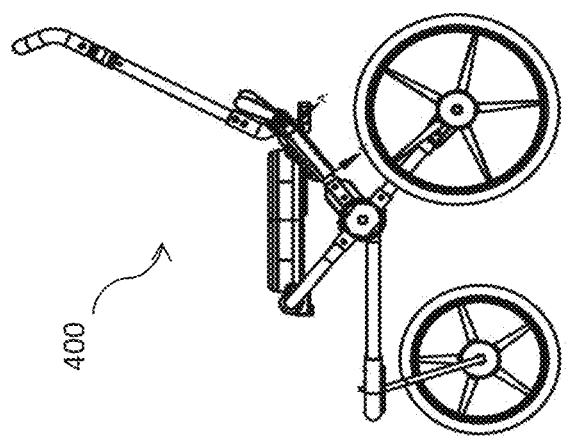
FIG. 5

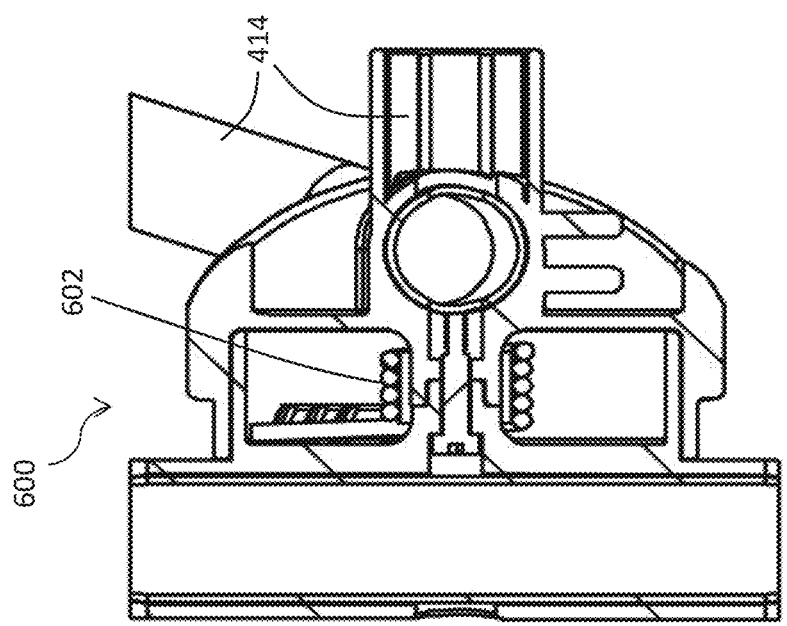
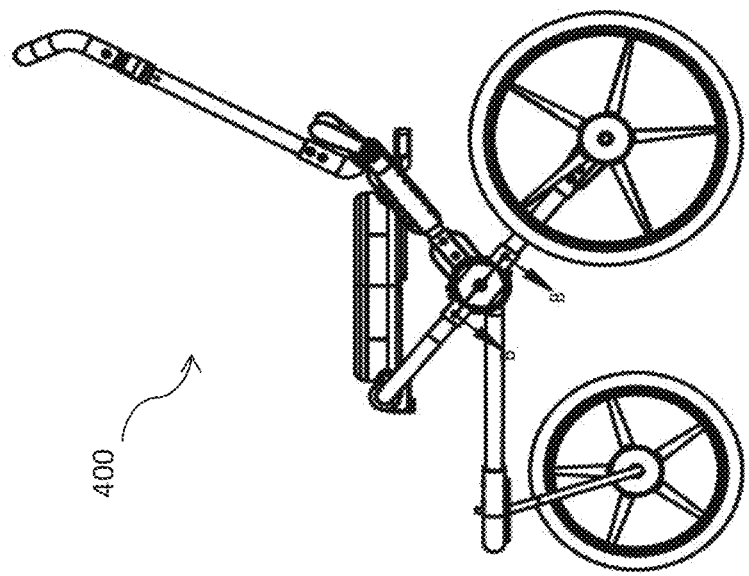
FIG. 6

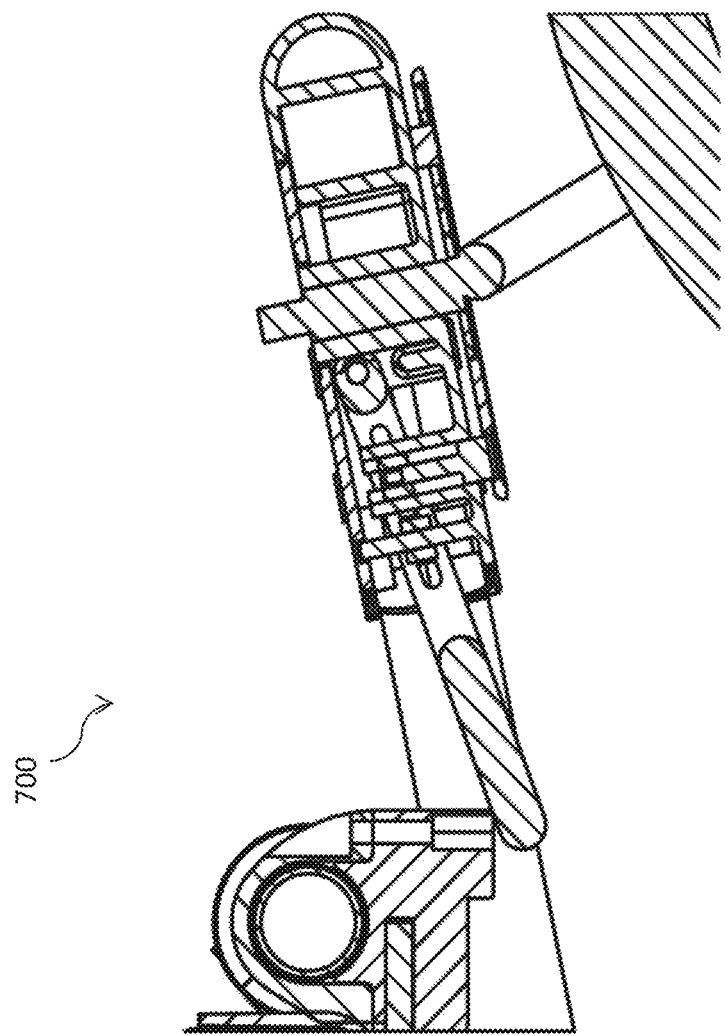
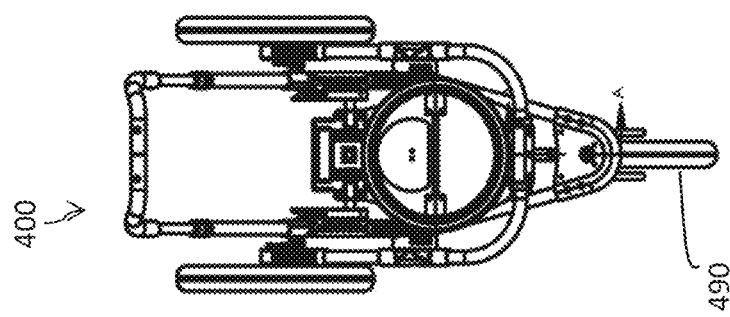
FIG. 7

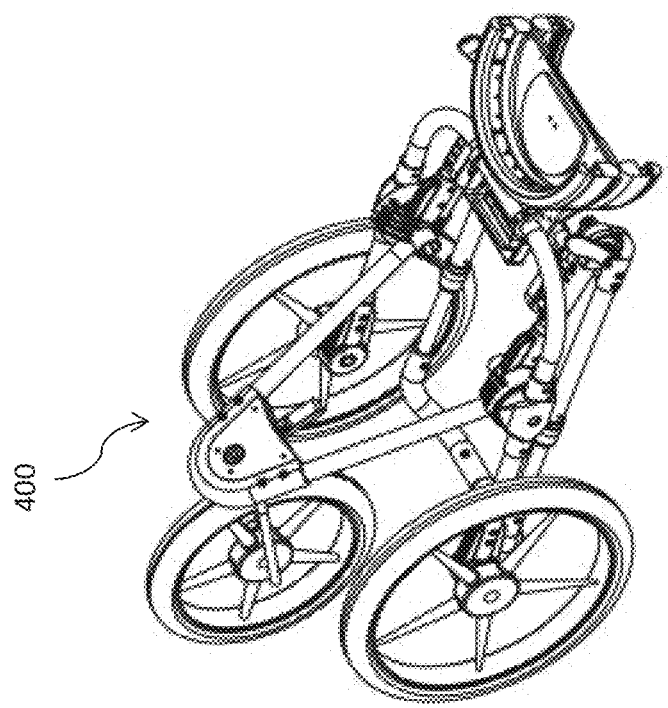
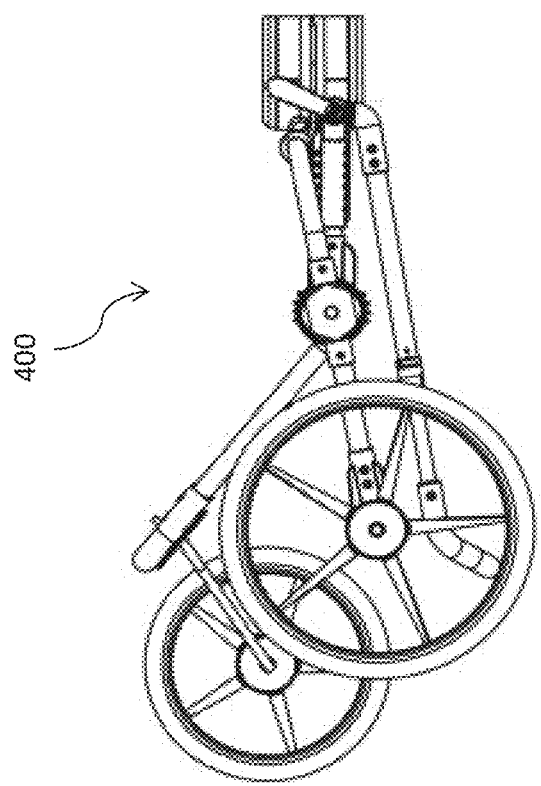
FIG. 8

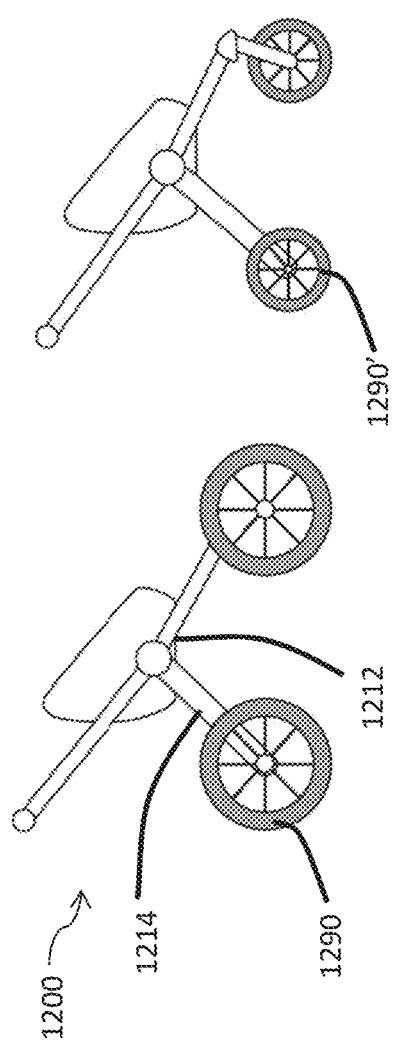
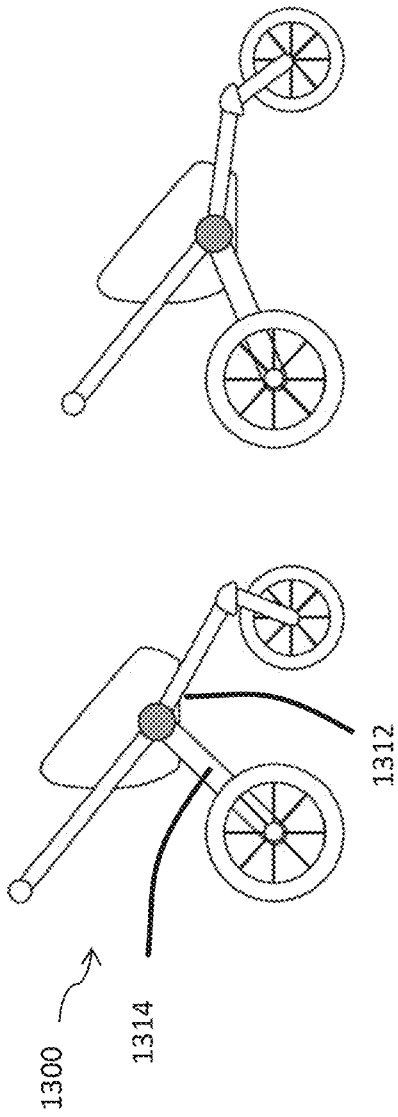
FIG. 12
FIG. 13

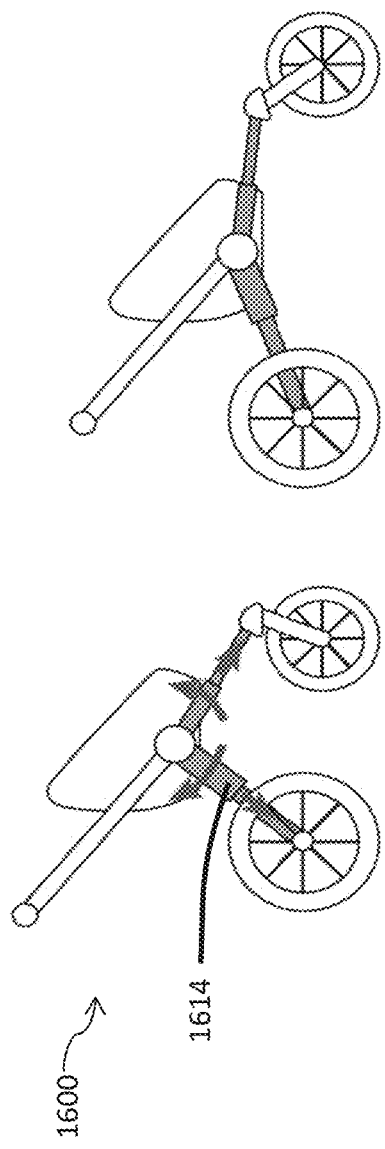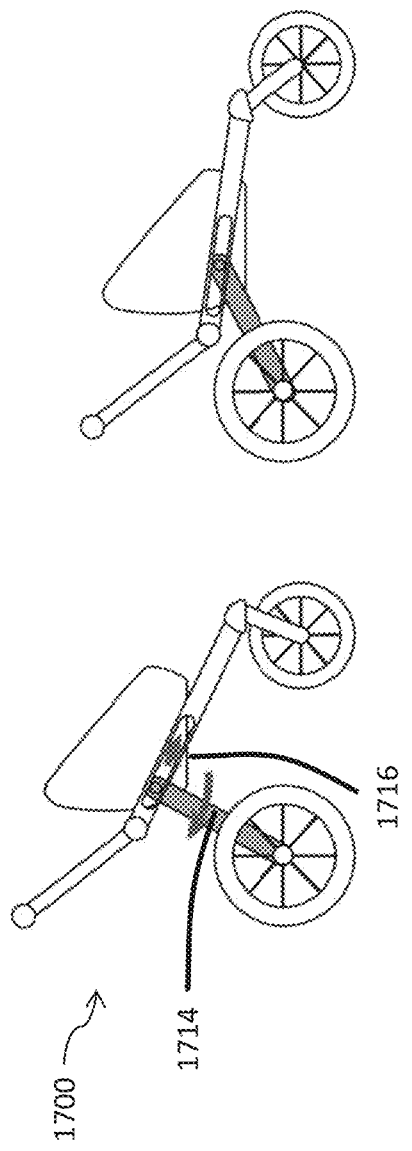
FIG. 16
FIG. 17

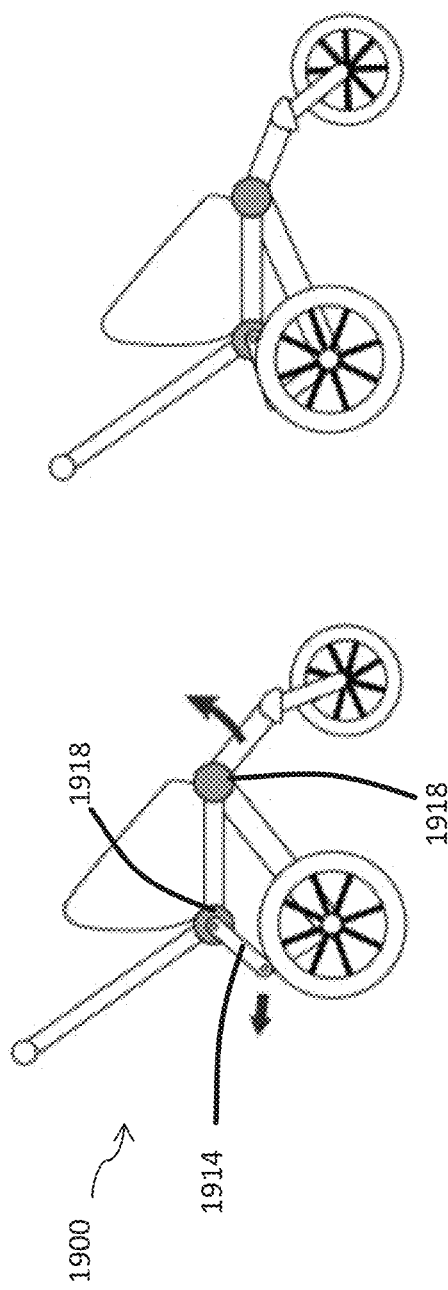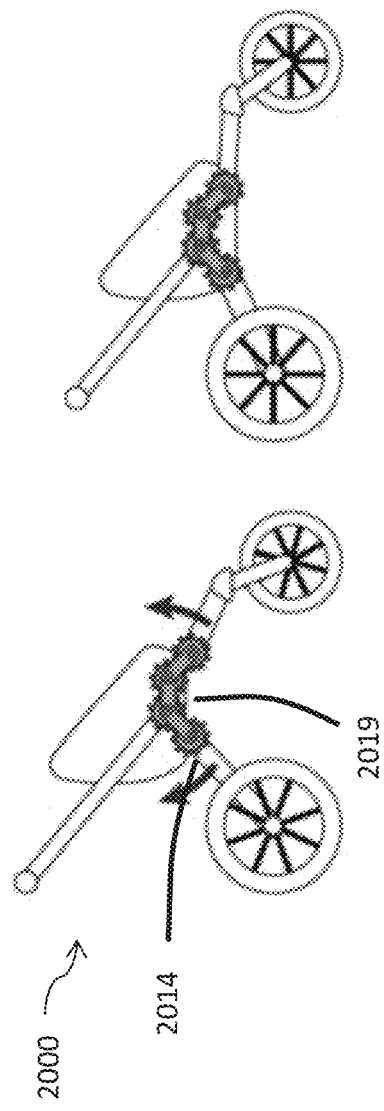
FIG. 19
FIG. 20

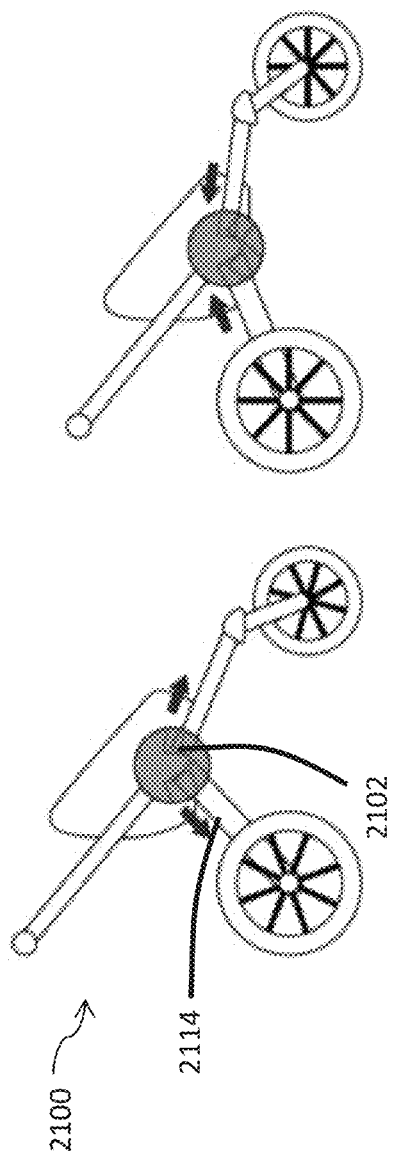
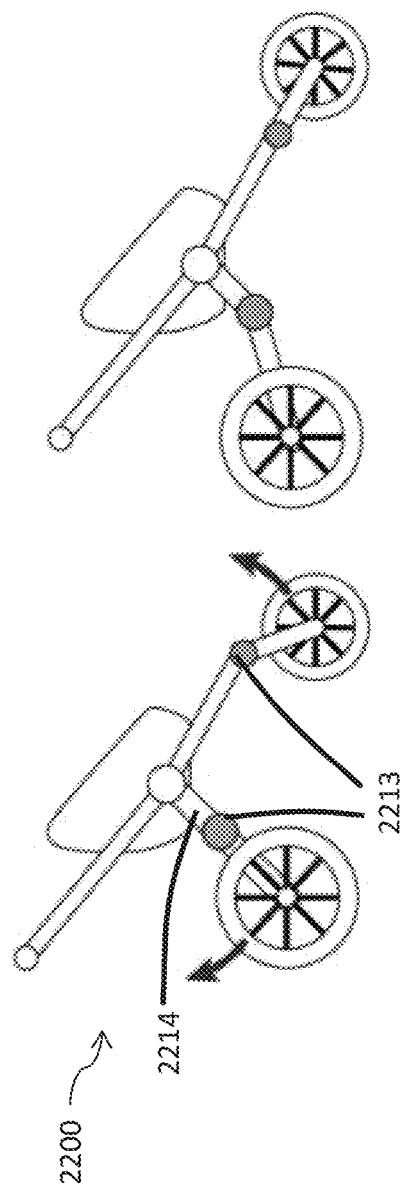
FIG. 21
FIG. 22

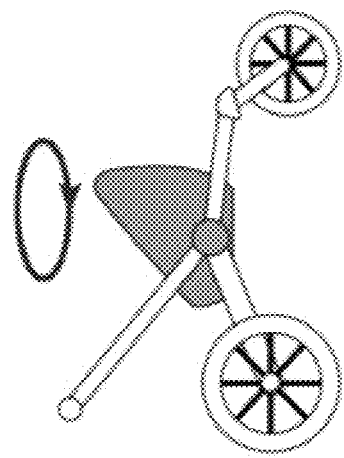
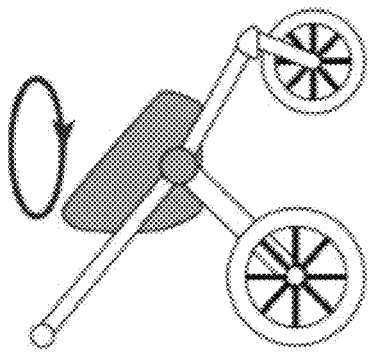
FIG. 27
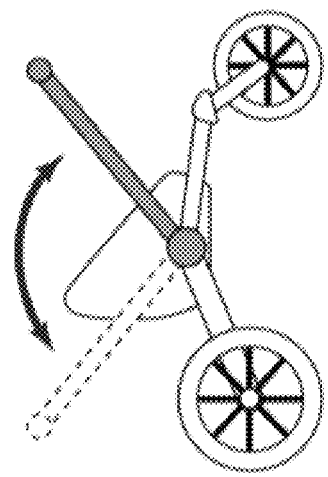
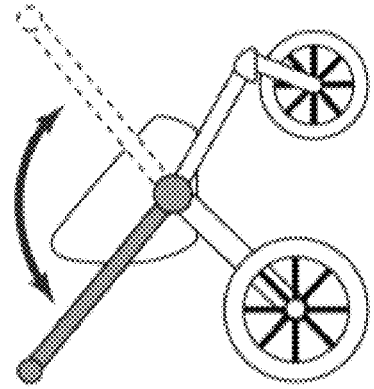
FIG. 28

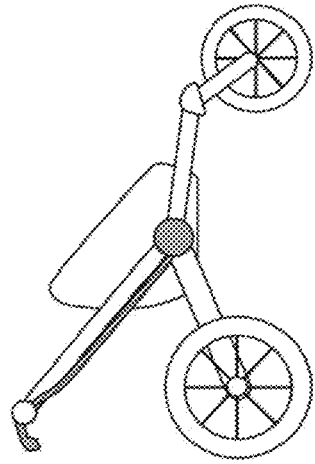
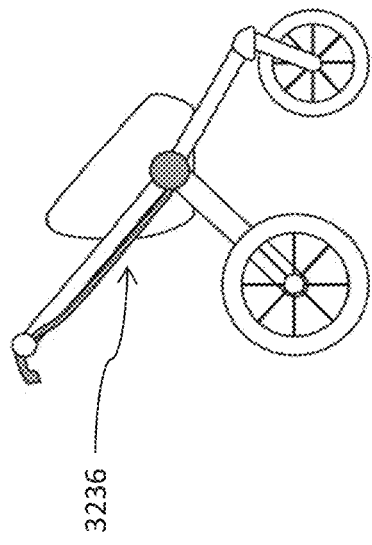
FIG. 32
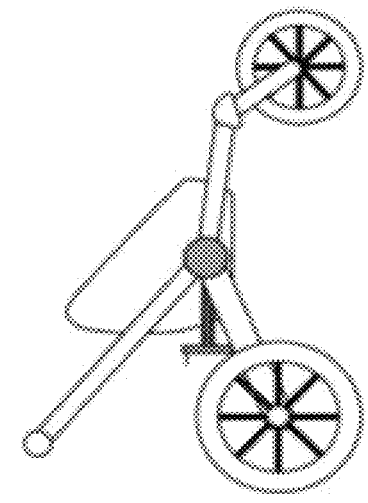
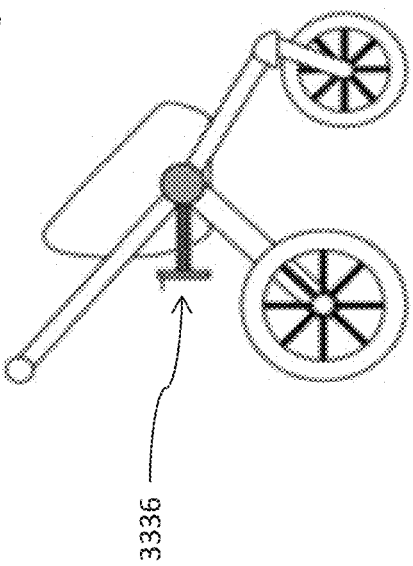
FIG. 33

CONVERTIBLE JOGGING AND ALL-TERRAIN STROLLERS

CROSS-REFERENCE TO RELATED APPLICATION

This Application claims the benefit of U.S. Provisional Application 62/009,770, entitled CONVERTIBLE JOGGING AND ALL-TERRAIN STROLLERS, filed on Jun. 9, 2014, which is hereby incorporated by reference in its entirety for all purposes.

BACKGROUND

Child strollers are well-known in the art. Child strollers generally comprise a chassis, wheels, a handle or handles, and seating for at least one child. For example, standard four wheel strollers are generally useful to transport a single child at a walking pace, on a generally smooth terrain, and may be designed to accommodate either an infant or a larger child.

Further, jogging strollers are well-known. Jogging strollers, which are similar to conventional walking child strollers, generally have a substantially longer wheel base and three larger wheels than conventional child strollers. For example, a jogging stroller typically includes two fixed rear wheels, e.g., they do not swivel, and a front wheel that may swivel. Accordingly, jogging strollers are typically larger, heavier, and have a larger turning radius than conventional four wheel strollers.

Purchasing, storing, and otherwise maintaining both walking and jogging strollers, can present numerous problems. In addition to the cost of purchasing multiple strollers, use and/or travel with multiple strollers is often impractical.

BRIEF SUMMARY

According to one aspect of the present invention a convertible stroller that adapts to usage—one distinct use mode for jogging, and one distinct use mode for everyday use—is provided. The stroller is convertible, for example, from a first use mode having a relatively short wheelbase, high profile to a second use mode having a relatively long wheelbase, low profile. The relatively short wheelbase, high profile use mode may provide for greater control, a shorter turning radius, and be suitable for everyday use in stores, congested sidewalks, and the like. In contrast, the relatively longer wheelbase, lower profile use mode may provide for greater stability and child comfort when jogging at higher speeds and/or uneven ground.

BRIEF DESCRIPTION OF THE DRAWINGS

FIGS. 4A-4D illustrate an exemplary convertible stroller according to a second example in a first and second use mode;

FIG. 5 illustrates a cross-section view of an exemplary locking mechanism, which may be used with the exemplary convertible stroller of FIGS. 4A-4D;

FIG. 6 illustrates a cross-section view of an exemplary biased transition mechanism, which may be used with the exemplary convertible stroller of FIGS. 4A-4D;

FIG. 7 illustrates an exemplary a cross-section view of an exemplary caster locking mechanism, which may be used with the exemplary convertible stroller of FIGS. 4A-4D;

FIG. 8 illustrates an exemplary folding system that may be incorporated with the exemplary convertible stroller; and FIGS. 9-34 illustrate various exemplary convertible strollers.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Jogging strollers have become increasingly popular thanks to the product category's versatility. The ability to handle rougher terrains and faster speeds than standard strollers has made these products extremely appealing among parents that want to continue to enjoy active lifestyles in the company of their children. There is also the reality that many of these all-terrain strollers are mostly used in standard settings, e.g. shopping. One aspect of the present invention is to provide a stroller with two active modes to address these different usage modes.

Figure 1:
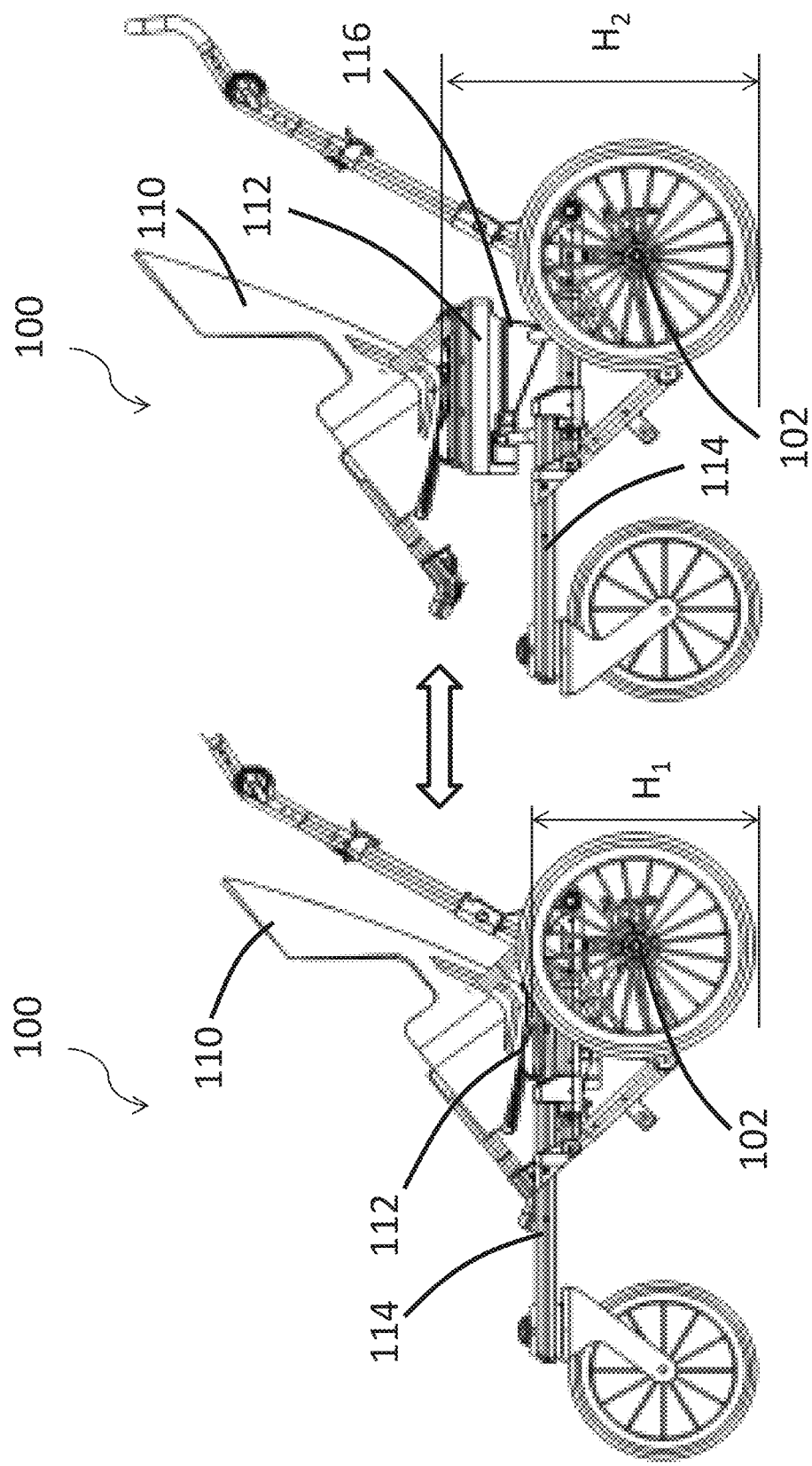
FIGS. 1A and 1B illustrate an exemplary convertible stroller according in a first and second use mode.

FIGS. 1A and 1B illustrate one aspect and example of the present invention, which includes a stroller 100 with a convertible seat 110 that changes location relative to the frame. In a first use mode (FIG. 1A), the seat 110 is located at a relatively lower height $H_1$ and closer to the rear wheel axles 102 (than in the second mode, which is raised to $H_2$, FIG. 1B) to provide a relatively higher center of mass. The first use mode is ideal for activities like jogging and hiking because it provides improved stability and handling due to the relatively lower center of mass. In the second mode, the seat 110 is raised and moved forward of the rear wheel axles 102 to bring the child passenger closer to the parent user and allow the seat 110 to rotate about its base 112. This second use mode is ideal for daily use interactions, e.g., when access to the child passenger is desired such as feeding.

Figure 2:
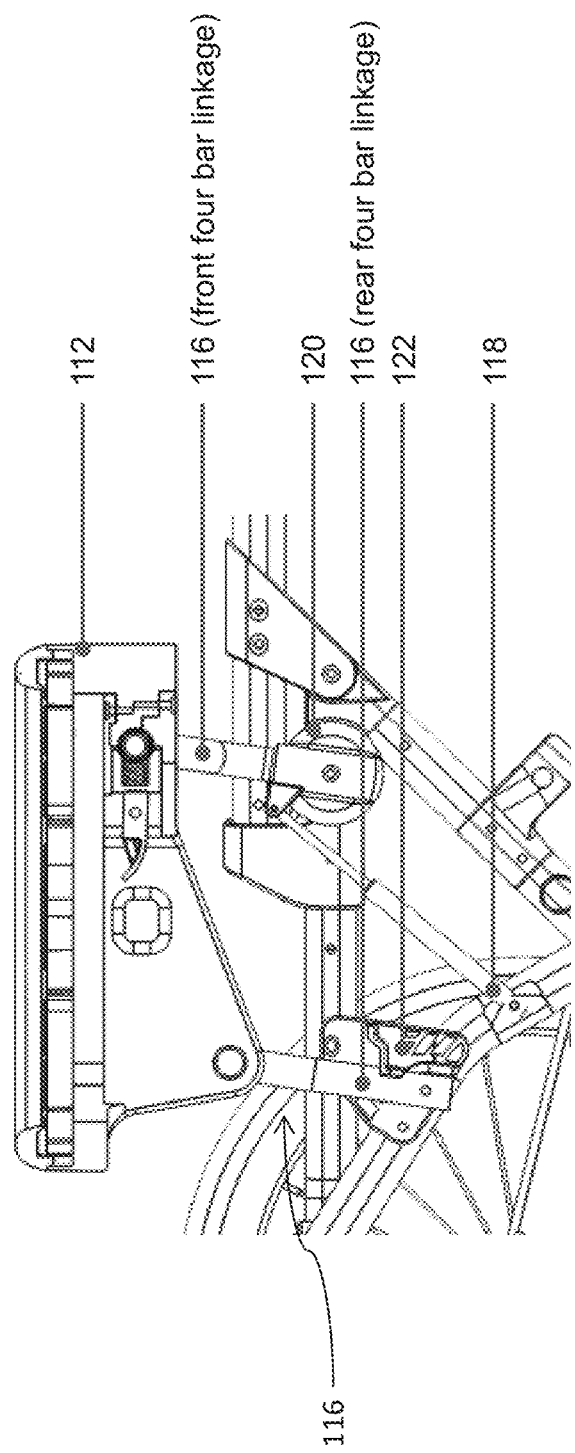
FIG. 2 illustrates an exemplary system for raising and lower a seat base for a first and second use mode.
Figure 3:
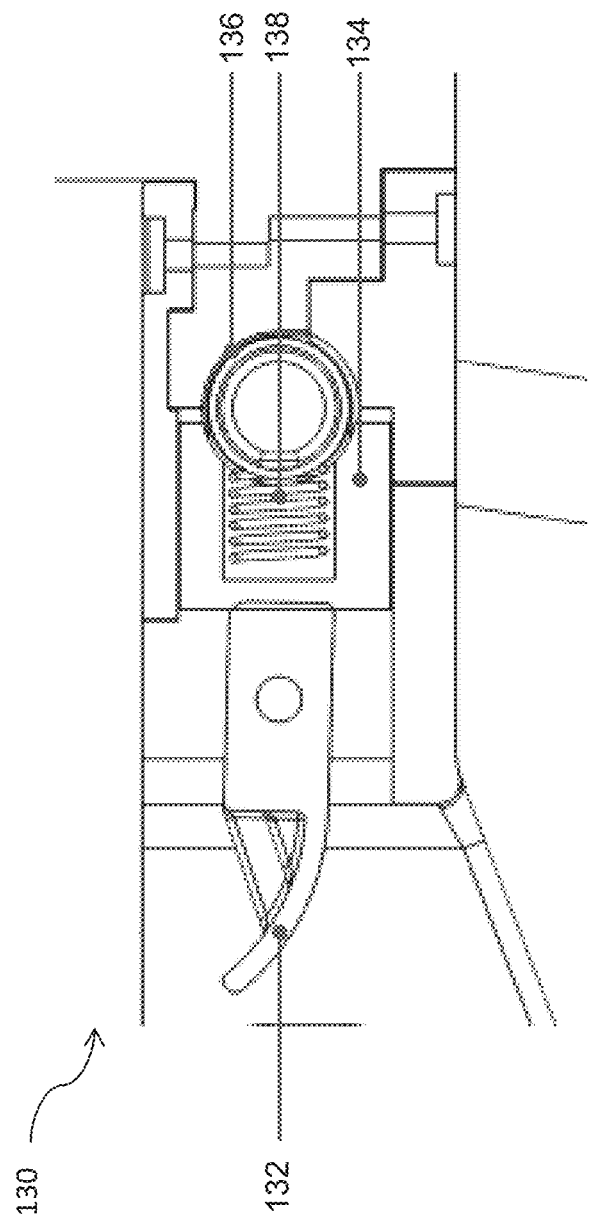
FIG. 3 illustrates an exemplary system for securing the base of a stroller according to one example.

In one example, seat base 112 is attached to the stroller frame 114 via a four bar parallelogram linkage 116 (shown in greater detail in FIG. 2), which is operable to position seat base 112 at different heights for the different use modes. The four bar linkage 116 includes hard stops (e.g., front hard stop 120 and rear hard stop 122) to support the four bar linkage 116 and/or the seat base 112 in both usage modes. In some examples, a gas strut 118 may be used to facilitate the conversion from the low position to the high position. Furthermore, pivot points of four bar linkage 116 can be arranged in such a way that the gas strut 118 presses the four bar linkage 116 against respective hard stops in both usage modes and therefore reduces vibrations and keeps the seat base in place while the user engages a conversion lock (e.g., as shown in FIG. 3). The pivot points of the four bar linkages can further be arranged so that, throughout the range of motion of the seat base, the linkages are never parallel to the lines connecting the pivot points, thus avoiding an indeterminate point.

In one example, seat base 112 may further include a locking mechanism 130. In one example, locking mechanism 130 includes a cam lever 132 that, when engaged, presses a sliding assembly 134 against the front four bar linkage tube 136, thus locking the rotation of the front four bar linkage and the entire system. The sliding assembly may also include chamfered metal locating pins that provide a stronger support in the event of a heavy load. When cam lever 132 is unlocked, a spring 138 (or other biasing member) pushes the sliding assembly 134 away from the front four bar linkage tube 136, which then becomes free to rotate into the other seat position (use mode).

It should be recognized that various other systems and methods may be used for raising and lowering seat 110 and/or base 112. Some additional examples will be described below and can be used interchangeable with different example strollers and systems provided herein.

FIGS. 4A-4D illustrate another exemplary convertible stroller 400 that is operable to adjust to the height of the seat/seat base 412 (e.g., height $H_2$ lower for stability and height $H_1$ higher for conventional use such as navigating crowded stores, sitting at a dining table, etc.) and further to adjust the wheel base (e.g., extending the wheel base from distance $W_1$ to $W_2$ for directional stability and terrain mitigation, and shorter for control). In some examples, the wheelbase is adjustable based on repositioning the stroller frame 414 and/or axes supporting the wheels. For instance, examples include: the front caster wheel 490 or wheels can lock into a non-swiveling position simultaneous to the mode conversion; the mode changing in height and length could happen in one simultaneous adjustment based on one primary interaction by the user.

In some examples, frame 414 may include a third member 417 (in addition to a first member 415 and second member 416 supporting the front and rear wheels respectively), which also serves as the seat platform. Member 417 may be linked to the rear wheels member and to the front wheel member as shown, where the front wheel member and the rear wheels member are connected at a point located below the third member and allowed to rotate about that given point.

In one example, a locking mechanism 480 may be further included (shown in greater detail in FIG. 5). Locking mechanism 480 may include spring loaded pins 482 that allows third member 417 to lock into two different positions with regard to the front wheel member 415. A user may disengage locking mechanism 480 by pulling on a lever (adjacent locking mechanism 480 or remote, e.g., near the handle) which retracts spring loaded pins 482 via tension cables 484. The two locking positions in the front wheel member 415 have a slotted track in between them which provides for a smooth transition between the active use modes.

The pivot point between the front wheel member 415 and rear wheels member 416 may further include a biased transition mechanism 600 as illustrated in FIG. 6. The biased transition mechanism 600 may reduces the amount of force necessary to transition from the lower height seat position to the higher seat position. For example, a torsion spring 602 engages both members 415 and 416 and its reaction force increases as the seat height is lowered.

The front caster wheel 490 of stroller 400 may further include a caster locking mechanism 700 that engages the front caster wheel 490 automatically once the lower seat height position is achieved. For example, the front of the lowered seat may press down on a lever that in turn presses on a locking pin that locks the front caster wheel 490 in place. The locking pin may be spring loaded (or otherwise biased) to allow the mechanism to work regardless of the front caster angle at the time of transition and to retract automatically once the seat is raised.

In one example, a convertible stroller can further be operable to collapse or fold, e.g., for storage, as illustrated in FIG. 8. In one example, the third member includes two halves that can be folded by disengaging a locking mechanism (e.g., pins, clamps, frictions, or the like) that keeps both halves in the same plane. Once the locking mechanism is disengaged, the front and rear end of the third member may be folded together, thereby allowing the frame to achieve a compact folded position.

Figure 9:
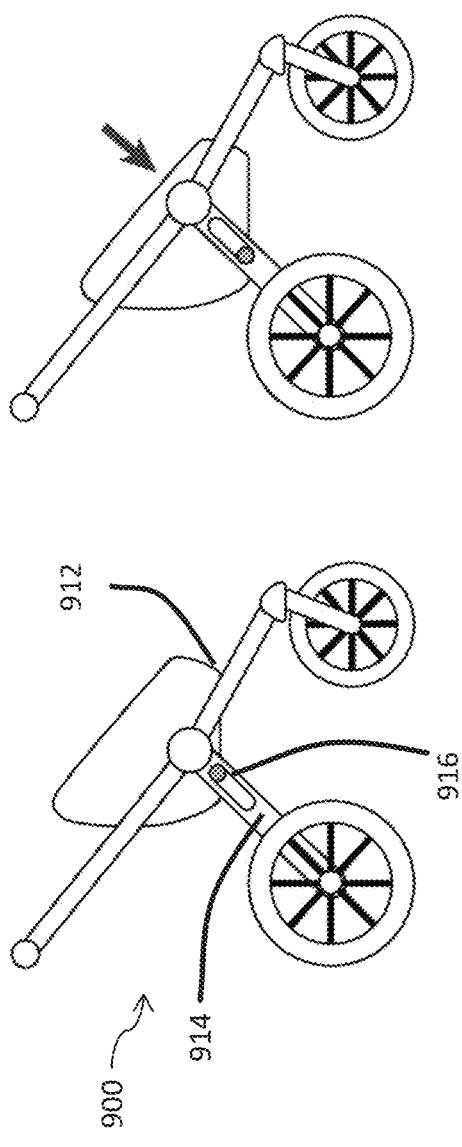

FIG. 9 illustrates another exemplary convertible stroller 900. In this particular example, a seat base 912 (and seat) is operable to raise or lower by sliding along a slotted member 916 of stroller frame 914. For example, seat base 912 can be slidably attached to a rear member of the stroller frame 914 as illustrated. Additional features such as biasing members, lock mechanisms, and so on may further be included to provide security and ease of use during transition between the different use modes.

Figure 10:
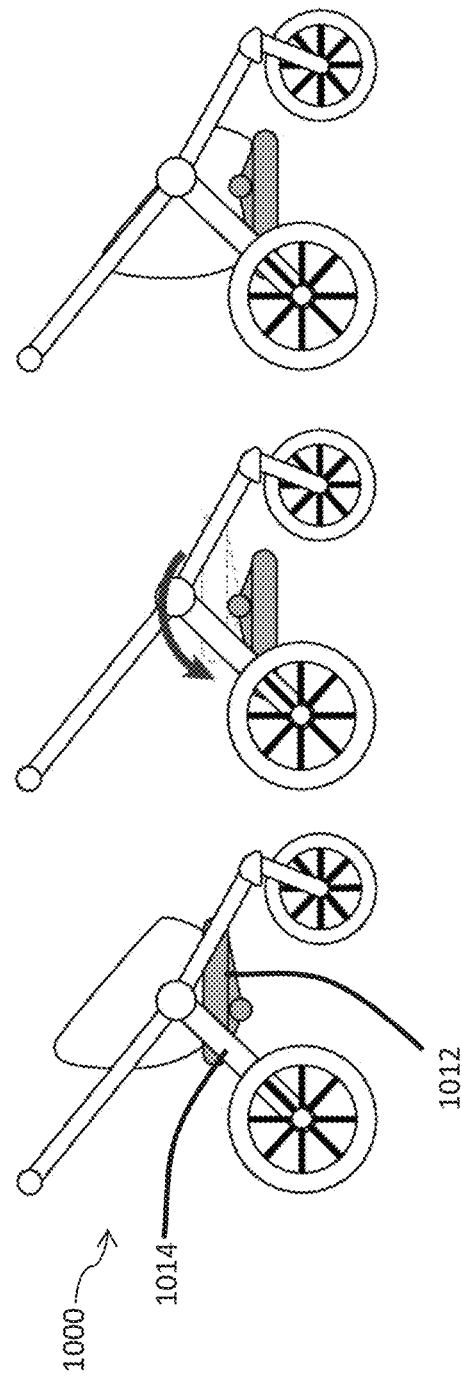

FIG. 10 illustrates another exemplary convertible stroller 1000. In this particular example, seat base 1012 is operable to raise or lower by rotating with respect to frame 1014, thereby providing support for seat at two different heights as illustrated. In such an example, seat base 1012 would be operable to accept a seat on both sides (e.g., a seat can be docked in both orientations). Again, additional features such as biasing members, lock mechanisms, and so on may further be included to provide security and ease of use during transition between the different use modes.

Figure 11:
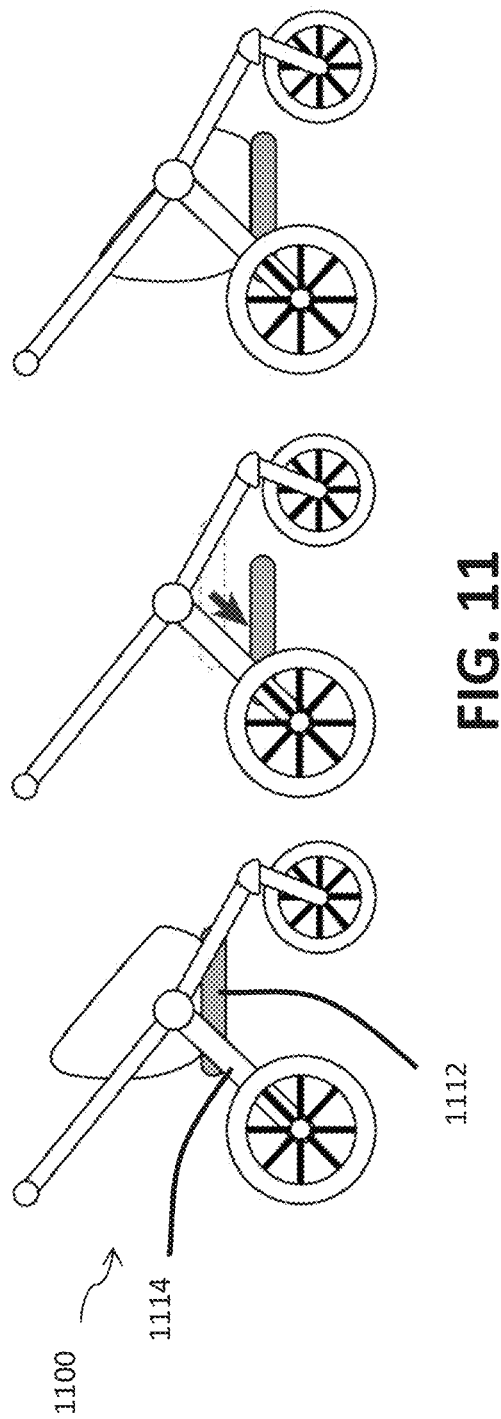

FIG. 11 illustrates another exemplary convertible stroller 1100. In this particular example, seat base 1112 may be detached and reattached at a relatively lower position for a second use mode (and vice versa). Again, additional features such as biasing members, lock mechanisms, and so on may further be included to provide security and ease of use during transition between the different use modes.

FIG. 12 illustrates another exemplary convertible stroller 1200. In this particular example, different sized diameter wheels 1290 and 1290' may be used, e.g., swapped in-and-out, for converting from a first use mode to a second use mode. Again, additional features such as quick release mechanisms for the wheels, biasing members, lock mechanisms, and so on may further be included to provide security and ease of use during transition between the different use modes.

Figure 14:
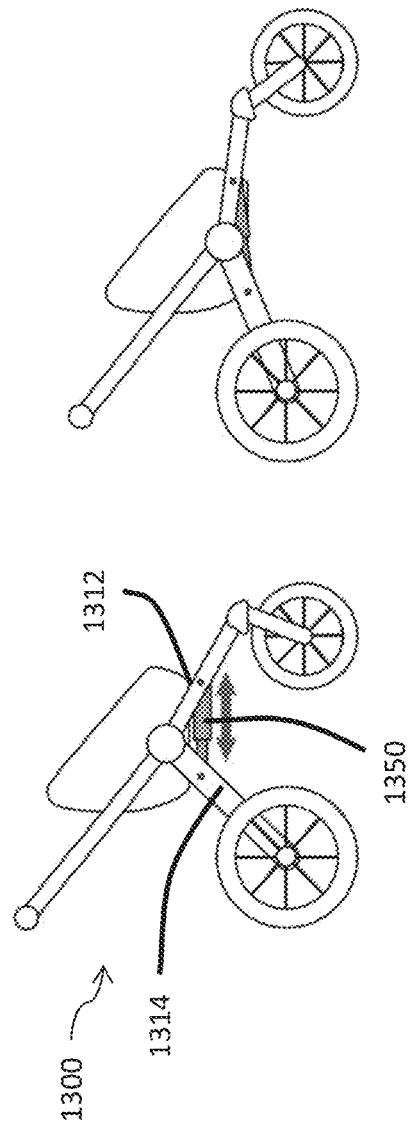
Figure 15:
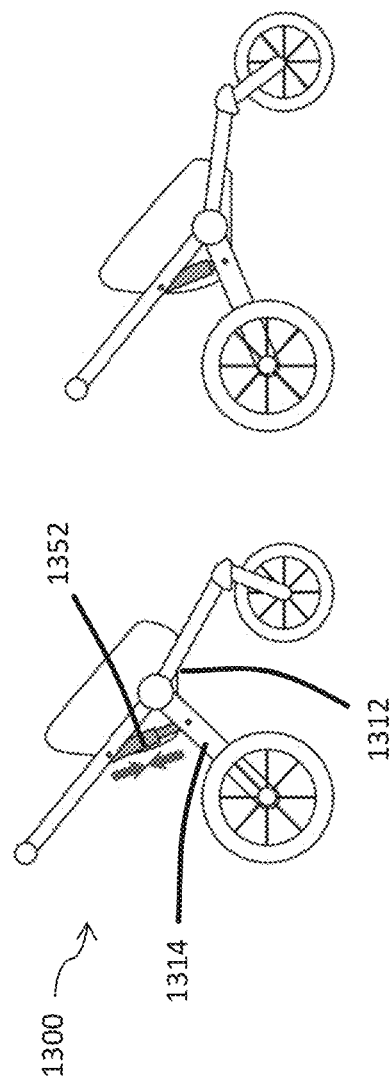

FIG. 13 illustrates another exemplary convertible stroller 1300. In this particular example, frame 1314 includes a single pivot, which when rotated changes both the height of the seat base 1312 and also the wheel base of stroller 1300. Additional features such as locking mechanisms, biasing mechanisms, and so on may further be included to provide security and ease of use during transition between the different use modes. For instance, as illustrated in FIG. 14, stroller 1300 may include a locking mechanism 1350, which may span horizontally between opposing members of frame 1314. Locking mechanism 1350 may include a biasing member and operate to secure frame in the different use modes. FIG. 15 illustrates another example, similar to FIG. 14, but including a vertical lock mechanism 1352.

FIG. 16 illustrates another exemplary convertible stroller 1600. In this particular example, frame 1614 includes telescoping members extending to support the wheels and a pivot (similar to that described above). Accordingly, members of frame 1614 can be rotated away from each other and extended to convert into a lower, longer wheel base use mode. Additional features such as locking mechanisms, biasing mechanisms, and so on may further be included to provide security and ease of use during transition between the different use modes.

Figure 18:
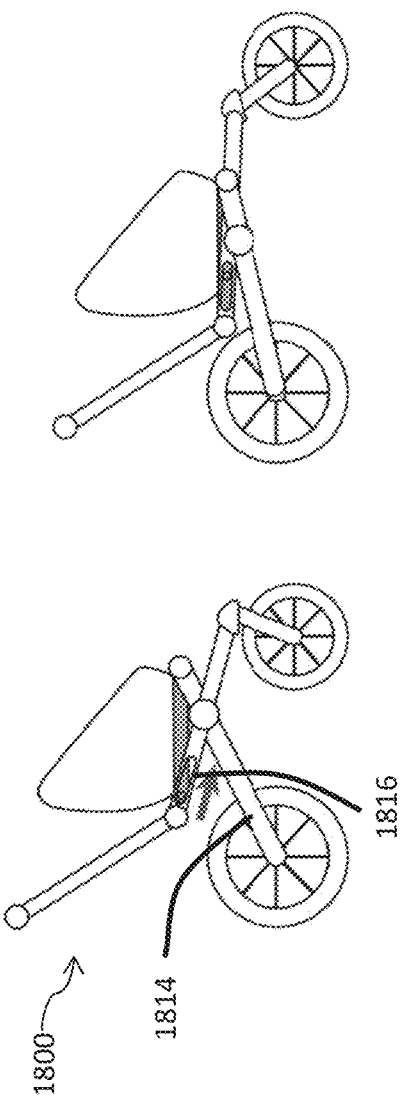

FIG. 17 illustrates another exemplary convertible stroller 1700. In this particular example, frame 1714 includes a sliding engagement 1716 whereby frame members can slide (and pivot) relative to each other to transition between use modes. (FIG. 18 illustrates another stroller 1800 example of a sliding engagement 1816 between members of frame 1814.) Accordingly, the members of frame 1714 can be both translated and rotated away from each other and extended to convert into a lower, longer wheel base use mode. Additional features such as locking mechanisms, biasing mechanisms, and so on may further be included to provide security and ease of use during transition between the different use modes.

FIG. 19 illustrates another exemplary convertible stroller 1900. In this particular example, frame 1914 includes multiple pivot points 1918 for transitioning between use modes. For example, frame 1914 includes two pivot points 1918, which rotate frame members as illustrated. Additional features such as locking mechanisms, biasing mechanisms, and so on may further be included to provide security and ease of use during transition between the different use modes.

FIG. 20 illustrates another exemplary convertible stroller 2000. In this particular example, frame 2014 includes multiple pivot points for transitioning between use modes that are linked together via a set of gears 2019 that operate to drive the conversion between different use modes. For example, as a user manually manipulates frame 2014 from one use mode to another, the various frame modes will be driven together based on the interlocking gear mechanisms 2019. Additional features such as locking mechanisms, biasing mechanisms, and so on may further be included to provide security and ease of use during transition between the different use modes.

FIG. 21 illustrates another exemplary convertible stroller 2100. In this particular example, frame 2100 includes a hub mechanism 2102 that supports frame members in multiple positions, thereby allowing frame stanchions or members to be removed and reinserted at different angles (as shown). Additional features such as locking mechanisms, biasing mechanisms, and so on may further be included to provide security and ease of use during transition between the different use modes.

FIG. 22 illustrates another exemplary convertible stroller 2200. In this particular example, frame 2200 includes articulated stanchions 2213 supporting the front and rear wheels, which may manipulated for different use modes (as shown). Additional features such as locking mechanisms, biasing mechanisms, and so on may further be included to provide security and ease of use during transition between the different use modes.

Figure 23:
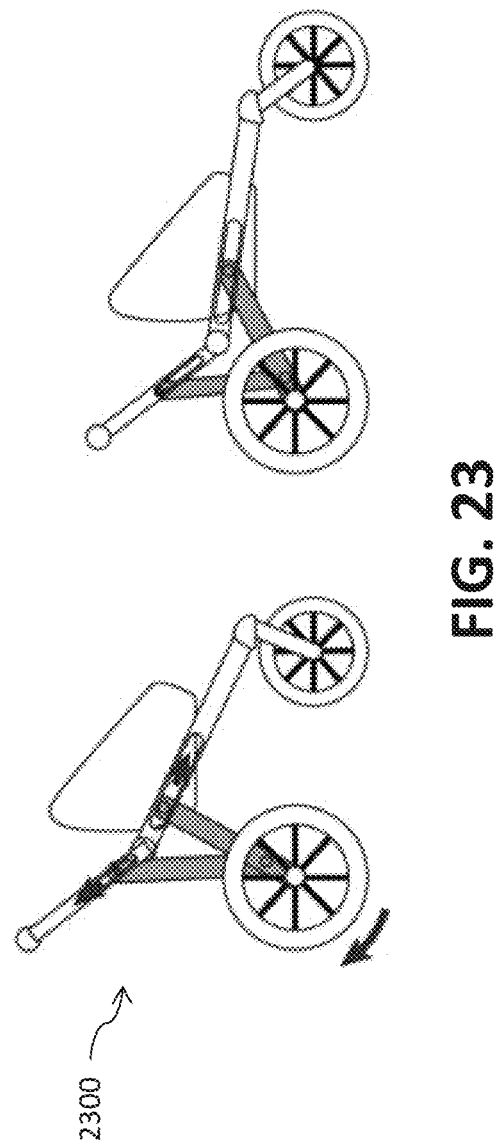

FIG. 23 illustrates another exemplary convertible stroller 2300. In this particular example, frame 2300 includes multiple pivot points and a sliding mechanism for transitioning to different use modes (as shown). Additional features such as locking mechanisms, biasing mechanisms, and so on may further be included to provide security and ease of use during transition between the different use modes.

Figure 24:
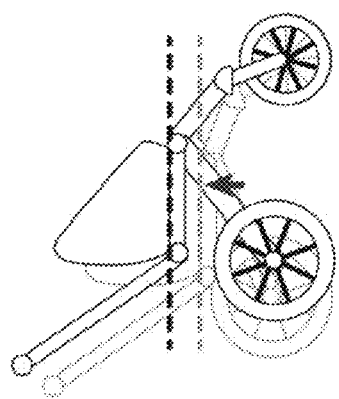
Figure 25:
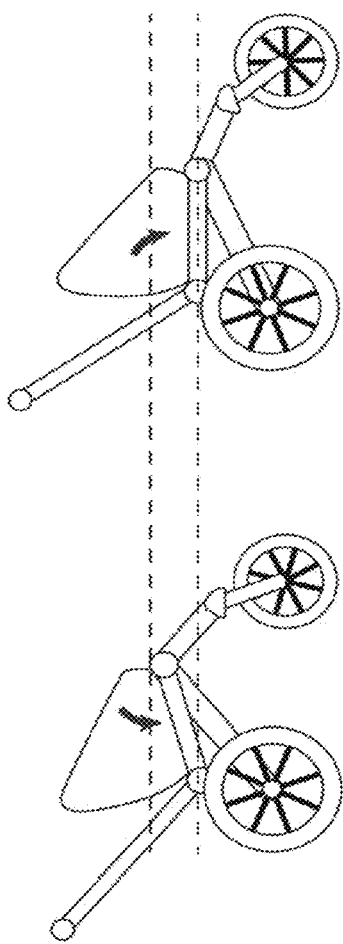
Figure 26:
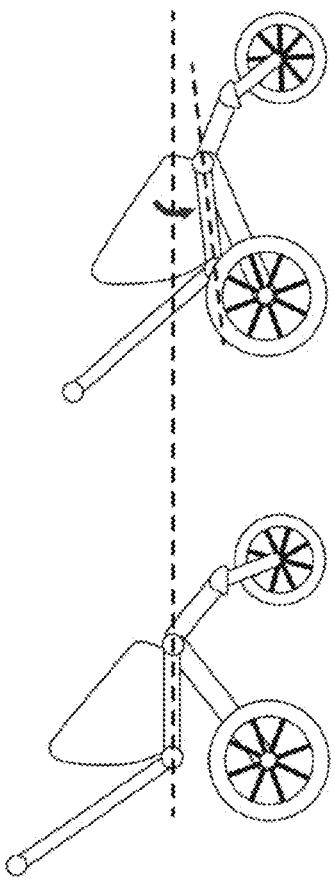

FIGS. 24-26 illustrate various conversion methods. In particular, FIG. 24 illustrates that in some examples, the seat may remain substantially level during conversion from a first use mode to a second use mode (which may make conversion while a child is seated easier than if the seat tilts or is removed for the transition). FIGS. 25 and 26, in contrast, illustrate examples where the seat may be temporality angled during mode transition but is situated substantially horizontally in the locked, use mode.

FIG. 27 illustrates an example where the orientation of the seat changes with the use mode. For example, where the child seat faces forward in a first use mode, and is reversed, rear facing in the second use mode. In some examples, the child seat can be rotated while remaining docked to the stroller or can be removed and redocked in the reverse position.

FIG. 28 illustrates a variation wherein the handles of the stroller move from one side of the stroller to the other side based on the desired use mode. For instance, being behind the child seat in one use mode and rotating over to a position in front of the child seat in a second use mode. In some examples, the user unlocking and moving the handles from one side to the other drives the conversion of the stroller from a first to a second use mode.

Figure 29:
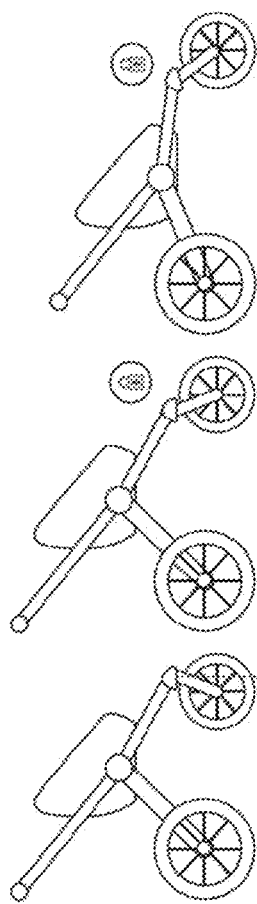
Figure 30:
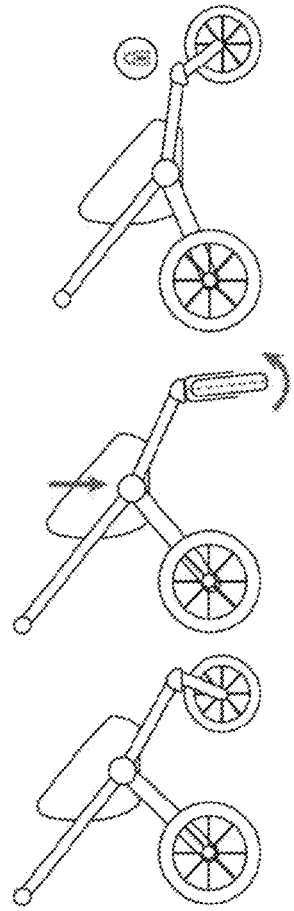
Figure 31:
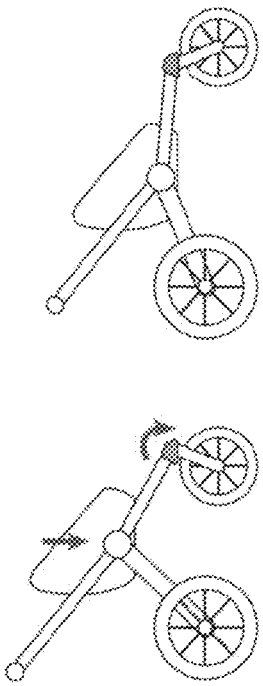

FIGS. 29-31 illustrate examples where a front wheel can be selectively locked, e.g., based on use mode. FIG. 29 illustrates an example where a user can manually lock the front caster wheel in one of at least two different orientations. FIG. 30 illustrates an example where the front caster wheel is operable to lock automatically based on the use mode. For example, when the stroller is positioned in a low use mode, the front wheel may be automatically locked in a front extending position as illustrated, and unlocked when in the high use mode. Automatically locking the wheel may be achieved by a pin lock or other mechanism that engages when the frame is positioned in the lower position. FIG. 31 illustrates an example where the front caster plane is operable to rotate to enable the front wheel rotation in both use modes.

FIGS. 32-33 illustrate various actuation systems which may be used with the various examples described herein. For example, as shown in FIG. 31, conversion can be driven though levers and cables 3236, wherein activation of the lever/cable releases a locking mechanism associated with the frame and allows conversion, e.g., a locking mechanism located with the pivot of the frame. FIG. 33 illustrates another example, where the conversion can be driven by a lead screw 3336, which upon rotation can act to rotate frame members relative to each other. It should be appreciated that unlocking and conversion could also be driven by servos, levers, buttons, and so on.

Figure 34:
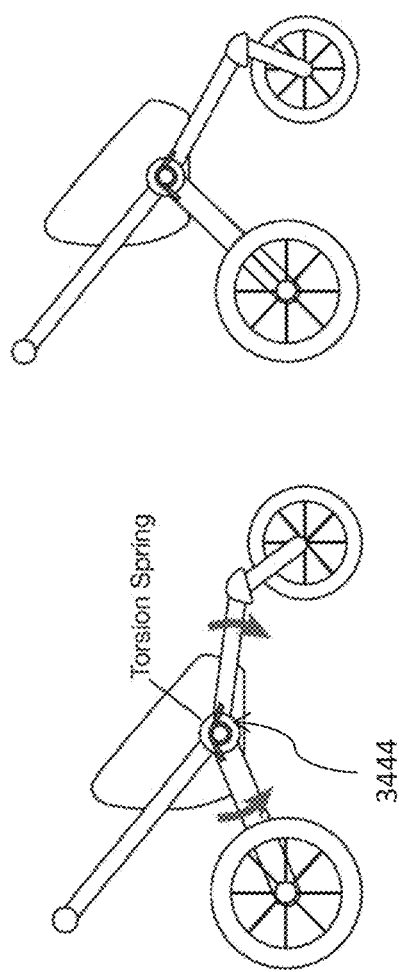

FIG. 34 illustrates an exemplary bias mechanism that may be used with various examples described. For instance, a torsion spring 3444 may be included to aid a user when transitioning the stroller from a lower to higher use mode. Of course, other biasing members may be used, and in some examples with multiple pivot points or slidable elements, multiple biasing members may be included.

The foregoing descriptions of specific embodiments have been presented for purposes of illustration and description. They are not intended to be exhaustive, and it should be understood that many modifications and variations are possible in light of the above teachings. For instance, it should be understood that various combinations of the examples described herein are contemplated.

What is claimed as new and desired to be protected by Letters Patent of the United States is:

1. A convertible stroller for selectively converting between two different active use modes, the convertible stroller comprising:
 a frame supporting:
 a seat base for supporting a seating surface;

at least one front wheel; and at least one rear wheel, wherein:

the at least one front wheel and the at least one rear wheel define a wheelbase as the distance between the center of the at least one front wheel and the center of the at least one rear wheel, and the frame is operable to be selectively positioned in at least two different use modes, a first use mode and a second use mode, wherein the first use mode is characterized by the stroller having a shorter wheel base than the second use mode, and the seat base is coupled to the frame via a four bar linkage assembly, wherein the four bar linkage assembly allows the seat to be selectively positioned at different heights relative to the frame in the first use mode and the second use mode.

2. The convertible stroller of claim 1, wherein the first use mode is further characterized by having a higher center of mass than in the second use mode.

3. The convertible stroller of claim 1, wherein the frame includes a first member supporting the at least one front wheel and a second member supporting the at least one rear wheel, and the first member and second member are joined by at least one pivot point.

4. The convertible stroller of claim 3, wherein relative rotation of the first member and the second member about the at least one pivot point position the frame in the at least two different use modes.

5. The convertible stroller of claim 1, wherein the frame further supports a seating surface.

6. The convertible stroller of claim 1, further comprising a biasing element for biasing the frame in one of the first use mode or the second use mode.

7. The convertible stroller of claim 1, further comprising a releasable locking element for locking the frame in one of the first use mode or the second use mode.

8. The convertible stroller of claim 1, further comprising a releasable locking element for locking a direction of the at least one front wheel in one of the first use mode or the second use mode.

9. The convertible stroller of claim 1, wherein the frame is operable to support a child and be actively used in both the first use mode and the second use mode.

10. A convertible stroller for selectively converting between two different active use modes, the convertible stroller comprising:

a frame supporting:

at least one front wheel;

at least one rear wheel; and a seat base for supporting a seating surface, wherein:

the seat base is coupled to the frame via a four bar linkage assembly and is operable to be selectively positioned in at least two different use modes, a first use mode and a second use mode, wherein the first use mode positions the seat base at a relatively higher position than in the second use mode.

11. The convertible stroller of claim 10, wherein the frame includes a first member supporting the at least one front wheel and a second member supporting the at least one rear wheel, and the first member and second member are joined by at least one pivot point.

12. The convertible stroller of claim 11, wherein relative rotation of the first member and the second member about the at least one pivot point position the seat base in the at least two different use modes.

13. The convertible stroller of claim 10, wherein the first use mode is characterized by having a higher center of mass than the second use mode.

14. The convertible stroller of claim 10, wherein the first use mode is further characterized by the stroller having a shorter wheel base than the second use mode.

15. The convertible stroller of claim 10, wherein the seat base supports a seating surface that is removable from the seat base.

16. The convertible stroller of claim 10, further comprising a biasing element for biasing the frame in one of the first use mode or the second use mode.

17. The convertible stroller of claim 10, further comprising a releasable locking element for locking the frame in one of the first use mode or the second use mode.

18. The convertible stroller of claim 10, further comprising a releasable locking element for locking a direction of the at least one front wheel in one of the first use mode or the second use mode.

19. A convertible stroller for selectively converting between two different active use modes, the convertible stroller comprising:

a frame supporting:

at least one front wheel;

at least one rear wheel;

a seat base for supporting a seating surface, wherein:

the seat base is operable to be selectively positioned in at least two different use modes, a first use mode and a second use mode, wherein the first use mode positions the seat base at a relatively higher position than in the second use mode; and a releasable locking element for locking a direction of the at least one front wheel in one of the first use mode or the second use mode, wherein the locking element locks automatically in response to positioning the seat base in the second use mode.

20. The convertible stroller of claim 19, wherein the frame is operable to support a child and be actively used in both the first use mode and the second use mode.

* * * * *